United States Patent [19]

DeYoung et al.

[11] Patent Number: 4,809,024

[45] Date of Patent: Feb. 28, 1989

[54] INK JET HEAD WITH LOW COMPLIANCE MANIFOLD/RESERVOIR CONFIGURATION

[75] Inventors: Thomas W. DeYoung, Stormville, N.Y.; John A. McCormick, Brookfield Ctr., Conn.

[73] Assignee: Dataproducts Corporation, Woodland Hills, Calif.

[21] Appl. No.: 87,986

[22] Filed: Aug. 17, 1987

Related U.S. Application Data

[63] Continuation of Ser. No. 661,794, Oct. 16, 1984, abandoned.

[51] Int. Cl.[4] .............................................. G01D 15/16

[52] U.S. Cl. .............................................. 346/140 R

[58] Field of Search .............................................. 346/140

[56] References Cited

U.S. PATENT DOCUMENTS

| | | | |
|---|---|---|---|
| 4,057,807 | 11/1977 | Fischbeck | 346/140 |
| 4,095,237 | 6/1978 | Amberntsson | 346/140 |
| 4,320,406 | 3/1982 | Heinzl | 346/140 |
| 4,385,304 | 5/1983 | Sniderman | 346/140 |
| 4,424,520 | 1/1984 | Matsuda | 346/140 |
| 4,459,601 | 7/1984 | Howkins | 346/140 |
| 4,468,680 | 8/1984 | Martner | 346/140 |
| 4,589,000 | 5/1986 | Koto | 346/140 |

*Primary Examiner*—Joseph W. Hartary

*Attorney, Agent, or Firm*—Woodcock Washburn Kurtz Mackiewicz & Norris

[57] ABSTRACT

An ink jet apparatus has a manifold and a feed tube of substantially the same cross-sectional areas as the manifold, thereby connecting the manifold with an ink reservoir so as to effectively present the large compliance characteristic of the reservoir at the manifold, and enabling a reduced volume print head construction which efficiently reduces cross talk and vibrational problems.

20 Claims, 1 Drawing Sheet

INK JET HEAD WITH LOW COMPLIANCE MANIFOLD/RESERVOIR CONFIGURATION

This application is a continuation of application Ser. No. 661,794, filed 10/16/84, now abandoned.

BACKGROUND OF THE INVENTION

This invention relates to ink jet apparatus for ejecting droplets of ink, and more particularly, to ink jet apparatus having an ink supply system permitting more efficient head construction while providing improved fluidic compliance as seen in the manifold.

In the field of ink jet apparatus there is generally provided an ink supply system comprising a reservoir containing ink, a manifold for supplying ink to the inlet restrictors of an array of channels, and some form of flow path from the manifold to the relatively remote ink reservoir. In apparatus having a large number of channels, for example 32 channels, there is a problem of minimizing cross talk in the form of pressure disturbances and waves through the manifold. A cross talk type of disturbance is generally characterized by the development of a pressure impulse in the manifold due to the small volume liquid injection derived from the pulsing of a jet. In order to reduce such cross talk, one standard arrangement has been to design a manifold to present the inlet restrictor paths with as large a fluidic compliance as possible, the magnitude of the pressure wave being inversely proportional to such compliance. The value of compliance is a function of both the compressibility of the liquid volume and flexibility of the wall surrounding the liquid. The manifold compliance is also important to minimize the effects of external shock and vibration which, in certain situations, can lead to depriming of the apparatus. This approach has led to arrangements wherein a large compliance is achieved by forming a major portion of the manifold wall with a thin compliant diaphragm.

The construction of a manifold so as to maximize its compliance generally requires an expansion of the size of the manifold in order to achieve the necessary flexural compliance of the diaphragm. This results in an ink jet head which is larger than optimum, requiring the ink reservoir to be situated at a substantial distance from the manifold. This requirement has led to a variety of designs which generally contain a tortuous flow path from the reservoir to the manifold. In this instance, even though the reservoir itself represents a nearly infinite fluidic compliance, the impedance of the connecting path does not allow the manifold to take advantage of this compliance. Thus, the manifold design itself must essentially take on the entire job of minimizing the cross talk and the effects of external shock or disturbance, and generally fails to take advantage of the beneficial compliance characteristics of the reservoir. Arrangements for optimizing the compliance characteristics of the manifold have resulted in a tradeoff of a larger manifold configuration for a larger print head and relative displacement of the reservoir away from the inlet restrictors. The problem is thus solved at the expense of requiring a larger and bulkier print head, which is clearly disadvantageous.

Another problem which results from a large sized manifold is that of air bubble generation at the time of filling the apparatus with ink. The feeding of ink from a relatively small inlet to a relatively large manifold may result in excessive air bubble generation. Of course, if the manifold is large, then a further space penalty must be paid if the inlet tube is made large so as to reduce the air bubble problem.

SUMMARY OF THE INVENTION

It is an object of the invention to provide an ink jet apparatus having a manifold/reservoir configuration which does not require the tradeoff of prior configurations, and optimizes cross talk disturbances and generation of air bubbles, while providing for a minimal print head size and short ink flow paths.

It is another object of this invention to provide an ink jet apparatus with a manifold configuration which effectively presents a high fluidic compliance without requiring the use of compliant materials in the manifold itself.

It is another object of this invention to provide ink jet apparatus with a short ink supply path configured so as to minimize apparatus volume while reducing the problem of trapping air during initial filling of the apparatus with ink.

In accordance with these and other objects, the ink jet apparatus of this invention provides a reservoir having at least a portion located in very close proximity to the ink jet chamber portion which contains an array of ink jet chambers, and a manifold system for feeding ink from the reservoir to the chambers including a narrow manifold with a very short feed tube connecting the manifold to the reservoir, the feed tube and the manifold having substantially matching cross-sectional areas. The narrow manifold is suitably constructed as a groove in the transducer support structure, such that the manifold as such does not contain any high compliance element, The short length of the inlet feed tube and the cross-sectional area matching of such tube with the manifold provides that the high compliance characteristic of the reservoir is effectively presented to the chamber inlets, thereby reducing cross talk and reducing the trapping of air when the apparatus is filled with ink.

DETAILED DESCRIPTION OF PREFERRED EMBODIMENTS

Figure 1:
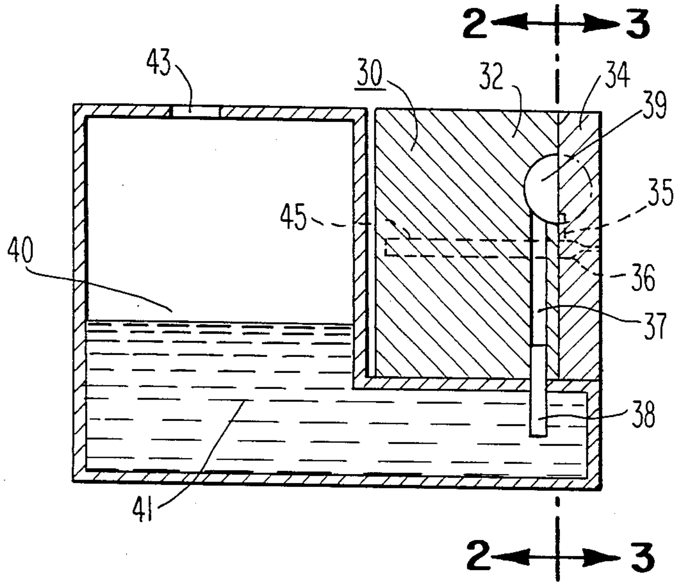
FIG. 1 is a diagrammatic side view of the integrated reservoir and print head of the apparatus of this invention.
Figure 4:
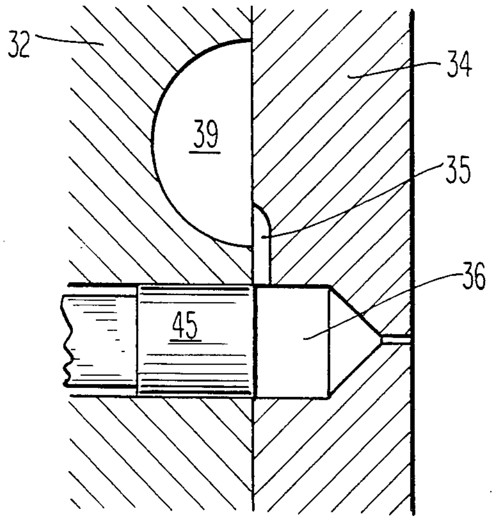
FIG. 4 is a detailed view of a portion of the print head illustrating the relationship of the manifold, ink jet chamber and transducer.
Figure 2:
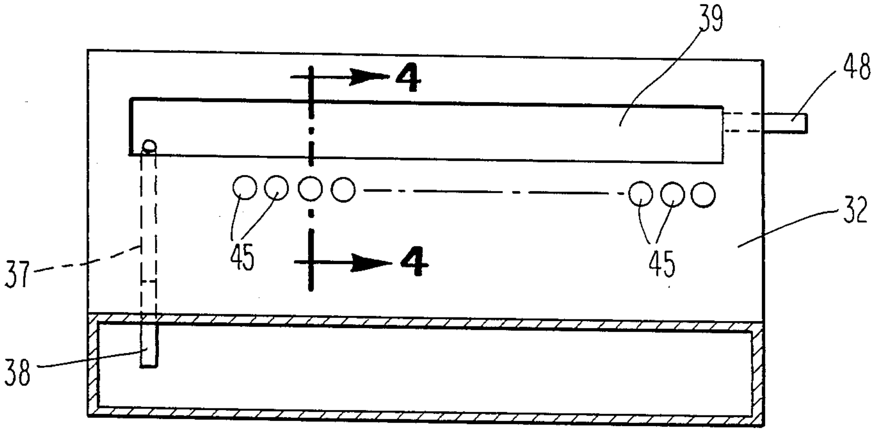
FIG. 2 is a sectional view taken along lines 2—2 of FIG. 1.
Figure 3:
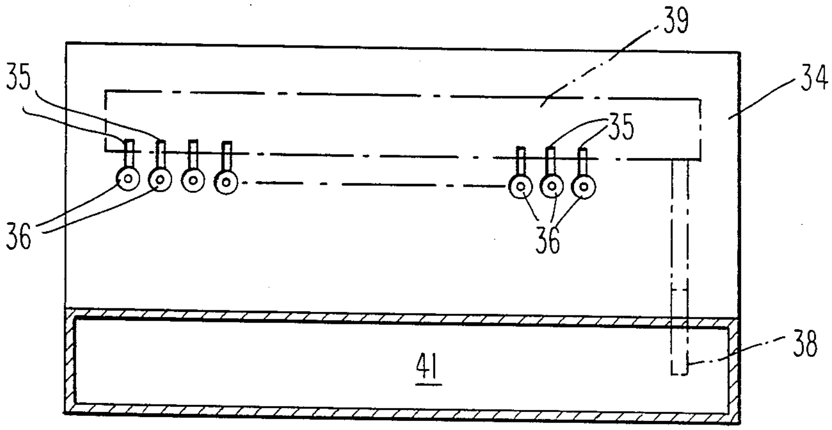
FIG. 3 is a sectional view taken along lines 3—3 of FIG. 1.

Referring to FIGS. 1–3, there is shown a configuration of ink jet apparatus comprising an integrally combined reservoir 40 and a print head, or ink jet head 30. The reservoir is defined by a housing which contains therein ink 41, and has a vent or port 43 supplying atmospheric pressure to the reservoir. Port 43, or other means not shown, may be utilized to introduce ink into the system either in the form of pellets of hot melt ink or other types of ordinary fluidic ink. The print head comprises a transducer support portion 32, which supports an array of transducers 45 (see FIG. 4). As illustrated in FIG. 2, the transducers are aligned longitudinally with the corresponding ink chambers 36, the activation of the transducers producing ink droplets in a known manner. To the front of transducer support portion 32 there is illustrated a chamber plate 34 which contains the chambers 36 and restrictor inlets 35, as further illustrated in FIGS. 3 and 4. Each chamber communicates with manifold 39 through its respective inlet 35, in a known fashion. In many ink jet arrangements, the ink jet head is constructed of laminar or plate construction, and while the inlet restrictors 35 are illustrated here as being grooved into the chamber plate, it is to be understood that there may be a separate inlet restrictor plate interposed between the transducer portion 32 and the chamber plate 34. Reference is made to copending U.S. application Ser. No. 604,128, filed Apr. 26, 1984, now U.S. Pat. No. 4,544,932, assigned to the same Assignee, which is incorporated by reference and discloses details of construction of an ink jet print head.

In a preferred embodiment, the manifold 39 consists of a hemispherical groove in the front of transducer support portion 32. Transducer support portion 32 may suitably be made of aluminum, such that the grooved wall of the manifold is aluminum, which as such does not present any compliance. Manifold 39 communicates with reservoir 40 through a manifold inlet 37, which is suitably a bore drilled vertically through the transducer support portion 32. An inlet tube as illustrated at 38 may be press fit up into the manifold inlet 37, and extends down into reservoir 40. Alternately, the print head may have a solid portion which extends further down into the reservoir, carrying the inlet bore 37.

As illustrated in FIGS. 2 and 3, manifold 39 extends from the inlet 37 and travels adjacent to and along the arrays of transducers 45 and chambers 36, and contains a vent 48 at its far end. The vent 48 is normally capped or plugged, but is unplugged for priming operations. In another preferred embodiment, the manifold 39 may be positioned in the chamber plate, as indicated by the dotted hemispherical line opposite the solid manifold line in FIG. 1. In this embodiment, the inlet tube turns to the front of the apparatus and communicates into the manifold groove in the chamber plate.

The manifold is preferably hemispherical in cross-sectional form, although it is within the scope of the invention to have other geometrical forms. For the hemispherical cross-sectional form, a radius of about 1/16 inch is preferred. Of whatever cross-sectional form, the manifold is relatively narrow in terms of the print head size and dimensions, and extends for only a very small fraction of the vertical height of the print head.

The manifold inlet 37, which conveniently has a substantially circular cross-sectional form, has a cross sectional area very close to that of the manifold, providing fluidic matching of the manifold and the inlet tube. It is preferred that the cross-sectional area of inlet 37 be matched no smaller than that of the manifold. The matching minimizes the fluidic impedance which is seen looking from the inlet array toward the reservoir. Further, by making the inlet cross-sectional area large, the problem of trapping bubbles in the manifold when the apparatus is filled with ink is minimized. In practice, the manifold is about two inches long, and the inlet is about one inch long, providing a total fluidic path of about three inches. It is preferred that the inlet length be much less than the manifold length, and have a large area, e.g., at least as large as that of the manifold, so as to minimize the impedance contribution of the inlet. A total manifold/inlet path in the range of three to four inches has been found satisfactory for good operation up to desired ink droplet firing rates of 10 KHZ, and higher.

The manifold/reservoir configuration of this invention, as described, enables a very narrow manifold, which in turn enables a reduction of volume of the print head and a close positioning of the reservoir in close proximity to the manifold itself. In the embodiment illustrated, a portion of the reservoir extends under the manifold and the chamber plate, enabling an inlet flow length of only about one inch from the reservoir to the manifold. In ink jet arrangements which require a wider manifold in order to achieve higher compliance, the greater width of the manifold makes it difficult to minimize the vertical extent of the head, and requires that the ink reservoir be generally situated a substantial distance to the rear of the manifold. This results in a longer flow path, which presents a high fluid ink impedance, effectively decoupling the high compliance reservoir from the manifold for purposes of pressure wave propagation. By contrast, in this invention the inlet pipe 37 is sized to very nearly match the manifold in cross-section, resulting in a relatively low resistance flow path in the L-shape as seen in FIG. 2. While the manifold does not have any diaphragm to provide wall compliance, this feature is no longer needed due to the fact that the relatively short and low resistance flow path effectively couples the manifold directly to the reservoir, enabling it to utilize and see the essentially infinite reservoir compliance.

From the above, it is seen that a primary advantage of the invention is derived from being able to use a short inlet feed tube together with a narrow manifold. The manifold is constructed of a simple groove or tube, having hard walls which themselves present no significant degree of fluidic compliance. The matching of the cross-sectional manifold to the cross-sectional area of the short inlet tube presents a low impedance path, i.e., a high conductance path, to the reservoir, and enables more efficient filling of the head with ink with reduced generation of air bubbles in the filling process.

Other embodiments and modifications will occur to those of ordinary skill in the art which will fall within the true spirit and scope of the invention as set forth in the appended claims.

We claim:

1. Ink jet apparatus, comprising:

an ink jet chamber portion containing a plurality of ink jet chambers, each chamber having a restrictor inlet and an exit orifice, reservoir means for holding a supply of ink under pressure, said reservoir means having a substantially infinite fluidic compliance and at least one portion located in close proximity to and beneath said chamber portion, and ink feed means for feeding ink from said reservoir means to said chambers, including a manifold adjacent to and in fluidic communication with each said chamber restrictor inlet and a feed tube connecting said reservoir with said manifold, said feed tube and manifold having substantially matching cross-sectional areas to provide a substantially low resistance to fluid flow of ink therethrough, whereby said ink feed means effectively presents said substantially infinite fluidic compliance of said reservoir to each said restrictor inlet.

2. The ink jet apparatus of claim 1, comprising a transducer support portion which houses an array of transducers corresponding to said jet chambers, and wherein said feed tube is a substantially circular cross-sectional passage through said support portion.

3. The ink jet apparatus of claim 2, wherein said manifold comprises a passage through said support portion of substantially hemispherical cross-section.

4. The ink jet apparatus of claim 2, wherein said manifold comprises a passage through said chamber portion having a substantially hemispherical cross-sectional form, and said feed tube has an upper outlet from said support portion which communicates with said manifold.

5. The ink jet apparatus of claim 1, wherein said feed tube is relatively short in length compared to the length of said manifold.

6. The ink jet apparatus of claim 1, wherein said feed tube is about one inch in length.

7. The ink jet apparatus of claim 1, wherein the combined length of said manifold and said feed tube is in the range of about three to four inches.

8. The ink jet apparatus of claim 2, wherein said manifold comprises a groove having a cross-sectional radius of about 1/16 inch.

9. The ink jet apparatus of claim 1, wherein the respective cross-sectional areas of said manifold and said feed tube are related such that said feed tube cross-sectional area is at least as great as the cross-sectional area of said manifold.

10. The ink jet apparatus of claim 1, wherein said reservoir portion is located below said chamber portion.

11. The ink jet apparatus of claim 1, wherein said manifold has a substantially non-compliant inner wall.

12. Ink jet apparatus, comprising:

an array of ink jet chambers formed in a print head having a, each of said chambers terminating in an ink jet droplet ejection orifice, and a short restrictor inlet passage connected to each of said chambers, a manifold having a predetermined narrow width with respect to the overall a substantially non-compliant wall, said manifold adjacent to and communicating with each of said restrictor inlets, a reservoir having a substantially infinite fluidic compliance located proximate to said manifold, an inlet feed tube communicating between said reservoir and said manifold, and said manifold and said inlet feed tube having an overall length that is predetermined to provide a ratio of said manifold's length said inlet feed tube's length in the range of from about 2:1 to about 3:1, substantially matched cross-sectional areas, and exhibiting an effectively low resistance to fluid flow so as to present said substantially infinite compliance of said reservoir to each said restrictor inlet passage and thereby reduce undesirable crosstalk and vibrational effects.

13. The ink jet apparatus of claim 12, wherein said manifold comprises a groove in a metal element.

14. The ink jet apparatus of claim 13, wherein said low impedance feed tube comprises a bore through said metal element.

15. The ink jet apparatus of claim 12, wherein said overall length comprises a length in the range of 3–4 inches.

16. The ink jet apparatus of claim 15, wherein said manifold has a substantially hemispherical cross sectional form, with a radius of about 1/16 inch.

17. Ink jet apparatus, comprising:

a print head having formed therein an array of ink jet chambers, each of which terminate at a respective ink jet droplet ejection orifice to form a linear array of said orifices, wherein said print head extends in a horizontal direction perpendicularly away from, in a first vertical direction perpendicularly up from, and in a second vertical direction perpendicularly down from said linear array of said orifices, whereby said horizontal direction extends towards said array of said chambers, a manifold of having a substantially non-compliant wall of and a substantially uniform cross-sectional area, said manifold being disposed adjacent to and in fluidic communication with each said chamber through a respective restrictor inlet passage, said wall being disposed at a distance from said array of said chambers in said horizontal direction that is substantially small with respect to a distance that said print head extends in said horizontal direction, a reservoir of ink, located proximate to said manifold and having a substantially high compliance, with a portion thereof being disposed beneath said manifold, an inlet feed tube communicating between said reservoir portion beneath said manifold and said manifold, said inlet feed tube having a substantially uniform cross-sectional area that is substantially equal to the cross-sectional area of said manifold, and a predetermined length substantially in said first and second vertical directions, whereby the substantially equal cross-sectional areas of said manifold and said inlet feed tube provide an effectively low resistance to fluid flow of said ink between said restrictor inlet passages and said reservoir, thereby presenting said substantially high compliance of said reservoir to each said restrictor inlet passage in order to reduce crosstalk and vibrational effects among said orifices.

18. The ink jet apparatus of claim 17, wherein said manifold is substantially parallel to said linear array of orifices and comprises a length that is at least approximately twice as long as said predetermined length.

19. The ink jet apparatus of claim 18, wherein said manifold length is approximately three times as long as said predetermined length.

20. The ink jet apparatus of claim 17, wherein an extent to which said wall of said manifold extends in said first and second vertical directions comprises a substantially small fraction of the extent to which said print head extends in said same directions.

* * * * *